UNITED STATES PATENT OFFICE.

LUDWIG BEREND, OF AMÖNEBURG-ON-THE-RHINE, GERMANY, ASSIGNOR TO DR. KURT ALBERT CHEMISCHE FABRIK, OF AMÖNEBURG-ON-THE-RHINE, GERMANY, A FIRM.

EMULSION PRODUCTS AND PROCESS FOR PRODUCING THEM.

1,107,020.     Specification of Letters Patent.     Patented Aug. 11, 1914.

No Drawing.     Application filed February 26, 1912. Serial No. 680,045.

*To all whom it may concern:*

Be it known that I, LUDWIG BEREND, chemist, citizen of Germany, subject of the King of Prussia and Emperor of Germany, residing at Landgrabenweg 14, Amöneburg-on-the-Rhine, in the Kingdom of Prussia and Empire of Germany, have invented new and useful Improvements in Emulsion Products and Processes for Producing Them, of which the following is a specification.

Processes are known for making products for technical purposes, which are emulsive in water, from asphalt, tars, pitch, resins, oils, hydrocarbons, cresols, and other substances insoluble or difficultly soluble in water, but all the known processes have certain disadvantages. These processes depend on the use of glue, soap, alkalis, starch, dextrin etc. But thereby the products are made rather dear. Moreover they remain always partly soluble after they have been employed and the water has evaporated.

The new products obtained by the process forming the subject matter of the present invention are on the contrary remarkable for their great persistency against water and by their high contents of emulsive substances. The essential feature of the new process is the use of condensed neutral or slightly alkaline waste lyes of sulfite cellulose as an emulsifying medium. For instance it is possible with about 5 parts of this sulfite lye to render soluble in water up to 95 parts of tar, what has hitherto never been attainable with any of the known processes. The above mentioned persistency or insolubility of the dried product against water is an advantage, which is of particular importance for instance when tar, asphalt or oils are to be used as weather-proof paints. Moreover these emulsion mixtures show the hitherto unknown property of remaining emulsified even after the addition of acid or neutral salt solutions, whereby it is possible on employing the emulsions as dust-binding media, to utilize jointly the dust-binding properties of entirely heterogeneous substances such as tar or mineral oil with lyes of chlorid of magnesium. This property is also highly valuable for impregnating liquids and disinfectants, in which tar, cresols, and the like and salts of mercury or other heavy metals are to be employed. If it were attempted for instance to mix an emulsion prepared with alkali, soap, glue or the like with a solution of chlorid of mercury, the respective emulsion medium would be immediately segregated and it would be impossible to obtain an emulsion in water. By the present process on the contrary such an emulsion is easily produced and may be diluted to any extent with water. Neither was it hitherto possible to combine emulsions containing oil, tar, resin and the like with formaldehyde or tannins without the respective colloidal solutions being destroyed. But also this may be easily obtained by aid of the emulsions obtained in accordance with the invented new process so that it is possible to produce very effective medicines and disinfectants, as well as technically valuable tannin products from tars, oils, cresols, tar-oils, hydrocarbons and the like, combined with formaldehyde or tannins.

A further advantage of the new process consists in that by the use of salts of metal chlorids, such as chlorid of calcium, chlorid of magnesium, chlorid of zinc and others extremely solid masses may be obtained by the subsequent addition of oxids or carbonates of these metals, the produced oxychlorids yielding together with the tars, oils, resins and the like very intimate compounds.

For producing a good lasting emulsion, it is of great importance, that the waste sulfite liquor be neutralized as far as possible until it no longer possesses an acid reaction.

The present invention furthermore renders possible a new extensive and profitable use of the hitherto so troublesome sulfite waste lyes.

The products prepared by the new process are to be used as paints, for impregnation, for preservative, dust-binding, disinfecting and paint-binding purposes, as letter-press and cloth-printing masses, finishing masses, metal or other polishes, for medical, cosmetic and many other purposes. They are also durable when diluted, what is of great importance for emulsion products.

In the following some examples for the production of the new emulsions are given.

Example I: To 250 gr. condensed sulfite cellulose waste lye, suitably neutralized with milk of lime, are added while stirring gradually 250 gr. of a solution of 100 gr. asphalt, 100 gr. tar and 50 gr. tar-oil, until the mixture has assumed the consistence of a homogeneous paste. Then some water and some of the above tar mixture in succession are stirred and mixed until 1250 gr. of the latter and 150 gr. of water have been consumed and the whole is mixed up, stirred and worked until a thoroughly homogeneous product is obtained which is perfectly and well emulsive in water.

Example II: 400 gr. linseed oil and 100 gr. oil of turpentine are emulsified with 100 gr. of the waste-lye of sulfite cellulose and 60 gr. of water to a thick paste soluble in water, in the manner indicated in Example I.

Example III: 850 gr. of mineral oil are emulsified with 150 gr. of condensed sulfite cellulose waste-lye as indicated in Example I, and are then gradually diluted with 250 gr. of chlorid of magnesium lye of 30° Bé., until a homogeneous emulsion is obtained.

Example IV: 200 gr. of tar oil, 200 gr. of creosote oil and 100 gr. of gas tar are emulsified with 100 gr. of sulfite cellulose waste-lye as indicated in Example I, but using instead of water alternately or in succession a 40% solution of formaldehyde and water until 100 gr. of formaldehyde solution have been consumed. Total weight of the emulsion obtained: 825 gr.

Example V: 500 gr. of the paste obtained by Example I are diluted with 1 kg. of chlorid of magnesium lye of 30° Bé. and are mixed then with 1 kg. of magnesite and 500 gr. saw-dust until a kneadable dough is produced which can be molded. This dough will stiffen in 12 hours to a very hard, strong mass.

Having now described my invention what I claim and desire to secure by Letters Patent of the United States is:

1. A process for producing emulsion products from substances practically insoluble in water which consists in emulsifying a high percentage of the insoluble substances by gradually adding portions of said insoluble substances and small quantities of water to concentrated waste sulfite liquor while agitating the mass.

2. A process for producing emulsion products from substances insoluble in water which consists in emulsifying said substances with a small percentage of concentrated waste sulfite liquor, said insoluble substances and small quantities of a watery solution of such substances which generally tend to destroy emulsions being gradually added to said waste sulfite liquor.

3. A process for producing emulsion products from substances practically insoluble in water which consists in emulsifying a high percentage of said insoluble substances by means of a small percentage of concentrated waste sulfite liquor by gradually adding portions of said insoluble substances and small quantities of water to said waste sulfite liquor while agitating the mass and adding a watery solution of a substance which tends to destroy emulsions.

4. A process for producing emulsion-products from substances practically insoluble in water, consisting in emulsifying such substances with a small percentage of concentrated waste sulfite liquor and a watery salt solution, and afterward adding an oxid composition of the metal contained in said salt.

5. A process for producing emulsion-products from substances practically insoluble in water, consisting in emulsifying such substances with a small percentage of concentrated waste sulfite liquor and a watery salt solution and then adding the oxid of the metal contained in said salt together with filling materials.

6. A composition comprising a high percentage of substances practically insoluble in water and a small percentage of the concentrated waste lye of the sulfite cellulose manufacture.

7. A process for producing emulsion products from substances practically insoluble in water which consists in emulsifying a high percentage of said insoluble substances by means of a small percentage of concentrated waste sulfite liquor by gradually adding parts of said insoluble substances and small quantities of water to waste sulfite liquor while agitating the mass and charging it with a watery solution of salts.

In testimony whereof I have hereunto set my hand in presence of two subscribing witnesses.

LUDWIG BEREND.

Witnesses:
HERMANN PLISCHSSE,
FRIEDRICH HATZMANN.